May 7, 1935.  R. CLOVER  2,000,823
TURNTABLE
Original Filed May 3, 1932   3 Sheets-Sheet 3
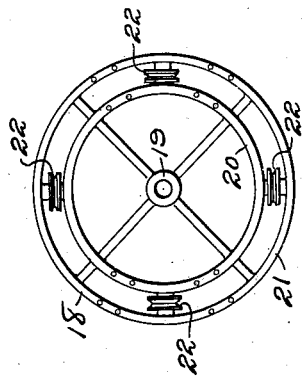
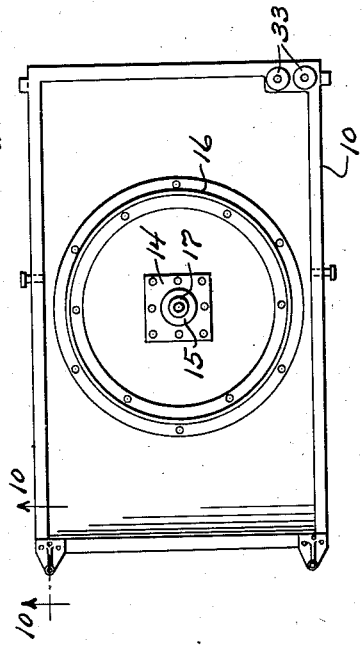
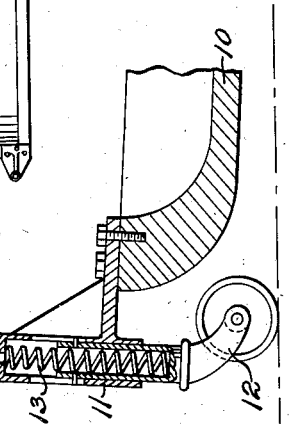
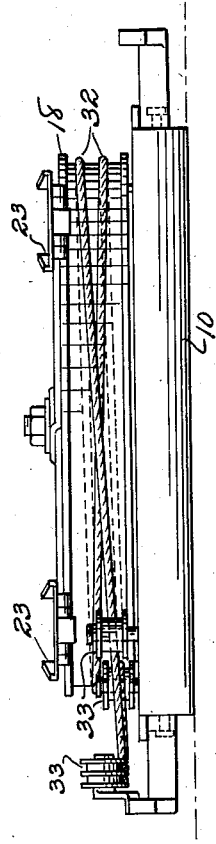
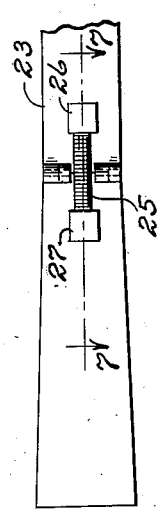
Ralph Clover INVENTOR
BY Victor J. Evans & Co.
ATTORNEY Patented May 7, 1935

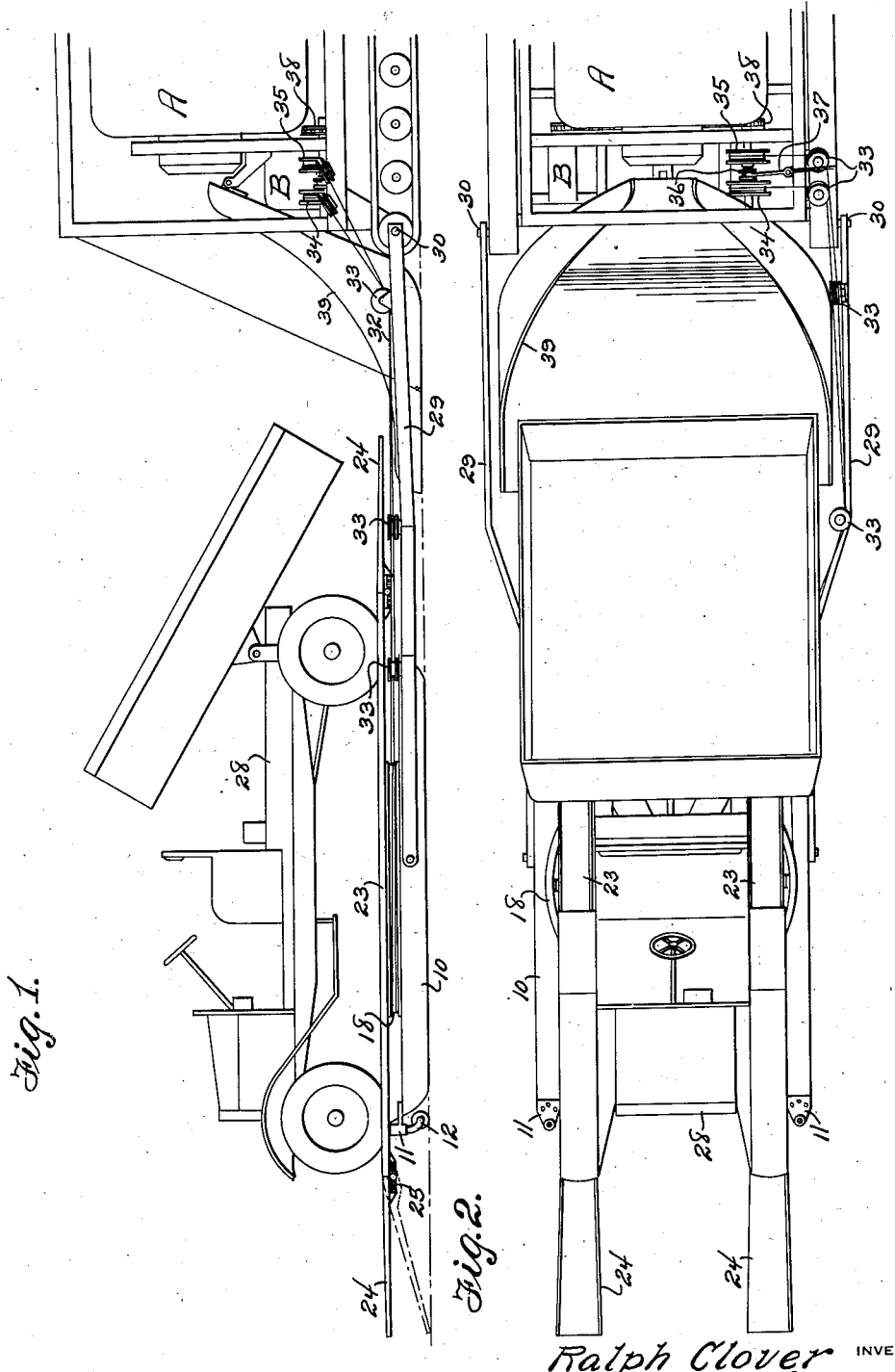

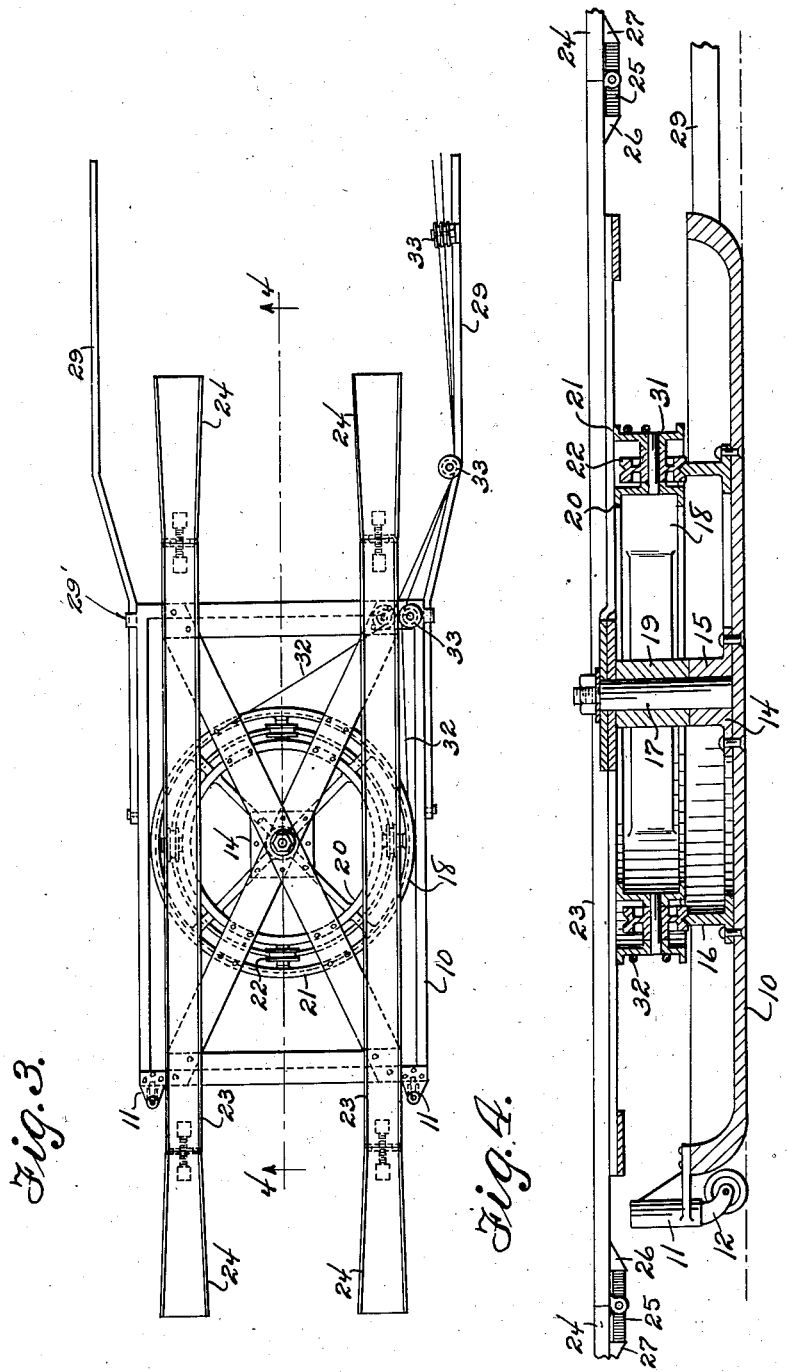

2,000,823

UNITED STATES PATENT OFFICE 2,000,823

TURNTABLE

Ralph Clover, North Vernon, Ind.

Application May 3, 1932, Serial No. 608,972
Renewed October 23, 1934

1 Claim. (Cl. 104—45)

The invention relates to a turntable and more particularly to a power operated turntable.

The primary object of the invention is the provision of a turntable of this character, wherein the construction thereof enables its association with a mixer or mortar so that the power of the latter can be transmitted thereto from such mixer or mortar to properly position the table whereby a truck or other carrier can be driven onto the table for the delivery of its load usable in the mixer or mortar.

Another object of the invention is the provision of a turntable of this character, wherein the track for the table is protected or guarded to avoid any possibility of material from the truck falling therefrom and jamming or settling into the bed of the turntable which would interfere with the smooth working thereof, the turntable in its entirety being of novel construction and operated in a novel manner.

A further object of the invention is the provision of a turntable of this character, wherein the table proper has oppositely arranged lead-ins so as to permit a truck or the like to be driven onto the table and be guided properly upon entrance thereto, the mounting of the turntable being of novel form so as to permit convenient connection of the turntable with a mixer or mortar and also shifting of the same.

A still further object of the invention is the provision of a turntable of this character which is comparatively simple in construction, thoroughly reliable and efficient in its operation and purposes, strong, durable, and movable by power from an associated mortar or mixer and also inexpensive to manufacture and install.

With these and other objects in view, the invention consists in the features of construction, combination and arrangement of parts to be hereinafter more fully described, illustrated in the accompanying drawings, which disclose the preferred embodiment of the invention, and pointed out in the claim hereunto appended.

In the accompanying drawings:—

Figure 1 is a side elevation showing fragmentarily a mortar or mixer and the turntable associated therewith and constructed in accordance with the invention, a truck being disclosed upon the turntable.

Figure 2 is a top plan view.

Figure 3 is a top plan view with the truck removed.

Figure 4 is a sectional view on the line 4—4 of Figure 3 looking in the direction of the arrows and on an enlarged scale.

Figure 5 is a vertical transverse sectional view.

Figure 6 is a fragmentary bottom plan view of one lead-in to the turntable.

Figure 7 is an enlarged sectional view on the line 7—7 of Figure 6.

Figure 8 is a bottom plan view of the turning gear of the turntable.

Figure 9 is a plan view of the supporting base of the turntable.

Figure 10 is an enlarged sectional view on the line 10—10 of Figure 9 looking in the direction of the arrows.

Similar reference characters indicate corresponding parts throughout the several views in the drawings.

Referring to the drawings in detail, A designates generally a portion of a mortar or mixer of any approved type, preferably of the rotatable drum kind operated from a motor B and in association with this mortar or mixer A is the turntable hereinafter fully described.

The turntable comprises a pan-like base 10, in this instance of substantially rectangular shape and at one end, that is to say, the outermost end, are hangers 11, these being disposed at the corners and in which are mounted casters 12, the latter each being subjected to compression through a spring 13 which functions to project the casters 12 for the normal elevation of the base 10 from the ground at the outermost end so that the base will incline in one direction. Centrally of the base 10 is a casting 14 forming a boss 15 while concentrically of this boss and mounted to the base 10 is a circular track 16. Carried in the boss 15 is a vertical stud axle or spindle 17 upon which is journaled a turning gear in the form of a spoked double rim wheel 18 having a central hub 19 journaled upon the axle or spindle 17, while between the rims 20 and 21 of this wheel 18 are journaled track rollers 22, these being peripherally channeled and adapted to travel upon the track 16. The wheel 18 constitutes the turntable.

Mounted upon the spindle 17 are spaced parallel wheel troughs 23, these being coextensive with each other and of a length greater than the length of the base 10. Hinged to opposite ends of the troughs 23 are outwardly flared lead-ins 24, these being in alignment with the troughs 23 and held normally in the plane therewith through the medium of tensioning springs 25 hung upon lugs 26 and 27 respectively formed on the undersides of the troughs 23 and lead-ins 24 as will be clearly apparent in Figures 6 and 7 of the drawings. The lead-ins 24 can be depressed for angular disposition or at an outward inclination with respect to the troughs 23 as shown by dotted lines in Figure 1 of the drawings and in this position a truck or other vehicle 28 can be driven onto the turntable and guided thereupon by the troughs 23 as will be apparent from Figures 1 and 2 of the drawings.

The base 10 of the turntable has pivoted to opposite sides thereof links 29, these being pivoted also to the frame or other part 30 of the mortar or mixer A for the coupling of the latter and the turntable as will be obvious from Figures 1 and 2 of the drawings. The side rails of the base 10 have the lugs 29' for contact with the links 29 so that the end of the base next to the mixer will be brought to rest upon said links. The wheel 18 at its outer rim 21 forms a pulley 31 having trained about the same a power cable 32, the latter being movable over guide rollers 33 and having its respective ends connected to windlasses 34 and 35 respectively, these being suitably mounted upon the mortar or mixer A and rendered operative by a clutch 36 having a manually shiftable control 37, the clutch being adapted to transfer power to either of said windlasses from a driving connection 38 with the motor B which may be of any desirable kind. On operating the clutch 36 by the control 37 the turntable may be shifted in one direction or the other, that is, rotated clockwise or counterclockwise. Located between the turntable and the mortar or mixer A is a scoop 39 which may be of any desirable kind for the trapping of material either from the truck 28 or from the mortar or mixer A.

When the truck 28 is driven onto the turntable the base 10 will have its end elevated by the casters 12 so that this base will come to rest in toto under the weight of the truck 28 when upon the turntable. It will be seen that the truck 28 can mount the turntable at any desirable angle and also may leave the turntable at any desirable angle, as the turntable is directionally changeable by rotation under power from the motor B of the mortar or mixer with which the same is associated. By reason of the elevation of the base 10 under the action of the tensioned casters 12 there is no liability of a dragging action of the base upon the ground when the turntable structure is moved from one locality to another and also the tilting of the turntable enables a truck to pass onto the same at the end thereof remote from the mortar or mixer A as this particular end of the turntable is supported solely by the casters, while the other end of the turntable next to the mortar or mixer is permanently elevated.

The construction and manner of operation of the turntable should be clearly understood from the foregoing detailed description and therefore a more extended explanation has been omitted.

What is claimed is:—

In a turntable for a concrete paver or mixer, a panlike base, casters carried at one end of said base and having tensioned connection therewith to normally elevate said base above the contact of the casters with the ground, link connections between the other end of the base and the paver or mixer, lugs on the sides of the base for contact with the link connections, a circular track centrally of the base, a horizontally disposed pulley wheel journaled centrally upon the base and having traction wheels movable upon the circular track, spaced parallel ramps superimposed upon the pulley and fixed thereto, and power cables trained about the pulley and operative for the turning thereof in opposite directions.

RALPH CLOVER.